Nov. 6, 1956  J. J. KEYSER  2,769,209
LAP OR BOBBIN FEED SYSTEM FOR SPINNING MACHINES
Filed Oct. 25, 1950  5 Sheets-Sheet 1
*Fig.1*
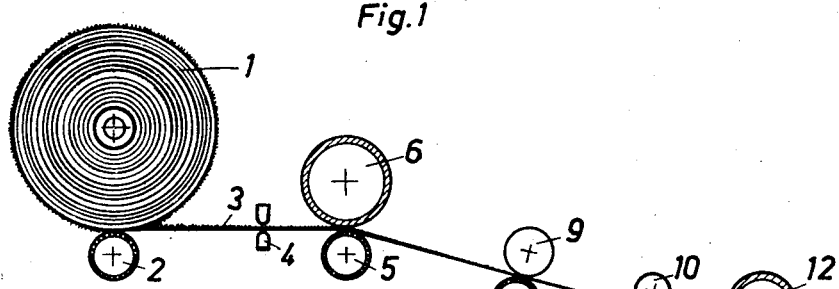
*Fig.2*
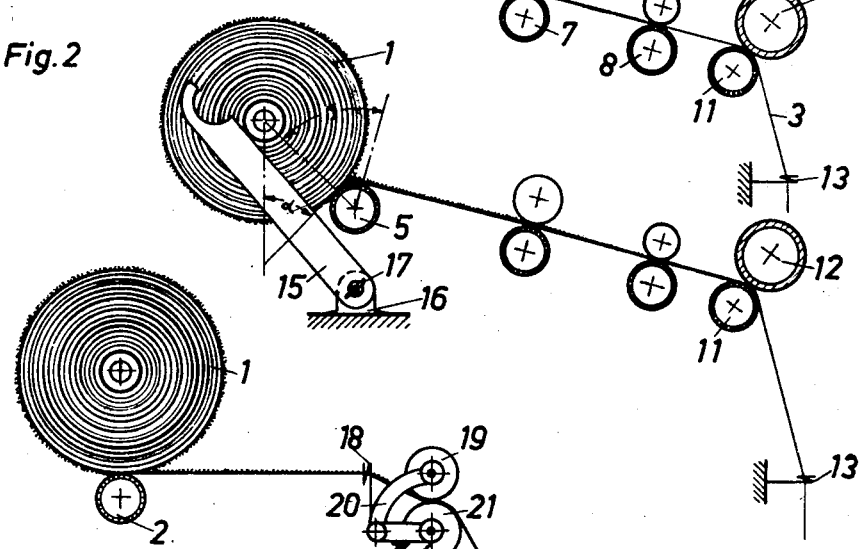
*Fig.3*
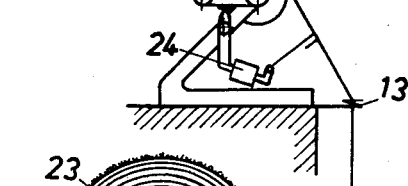
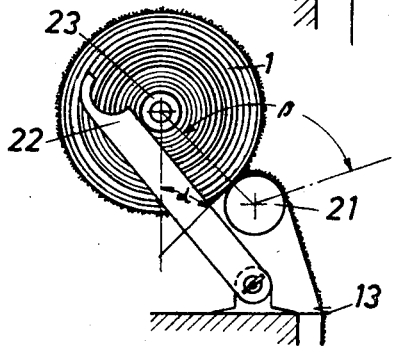
*Fig.4*
Inventor:
JOHANN JACOB KEYSER
by
Toulmin & Toulmin
Attorneys Nov. 6, 1956  J. J. KEYSER  2,769,209
LAP OR BOBBIN FEED SYSTEM FOR SPINNING MACHINES
Filed Oct. 25, 1950  5 Sheets-Sheet 3

Inventor:
JOHANN JACOB KEYSER by
Toulmin & Toulmin

Attorneys,

Nov. 6, 1956   J. J. KEYSER   2,769,209
LAP OR BOBBIN FEED SYSTEM FOR SPINNING MACHINES
Filed Oct. 25, 1950   5 Sheets-Sheet 4

*Inventor:*
JOHANN JACOB KEYSER by
Toulmin & Toulmin

*Attorneys*

Nov. 6, 1956  J. J. KEYSER  2,769,209
LAP OR BOBBIN FEED SYSTEM FOR SPINNING MACHINES
Filed Oct. 25, 1950  5 Sheets-Sheet 5

Inventor:
JOHANN JACOB KEYSER by
Toulmin & Toulmin

Attorneys

United States Patent Office 2,769,209
Patented Nov. 6, 1956

2,769,209

LAP OR BOBBIN FEED SYSTEM FOR SPINNING MACHINES

Johann Jacob Keyser, Aarau, Switzerland, assignor to Schiess Aktiengesellschaft, Dusseldorf-Oberkassel, Germany Application October 25, 1950, Serial No. 192,134

Claims priority, application Switzerland October 29, 1949

13 Claims. (Cl. 19—130)

This invention relates to lap or bobbin feed system for spinning machines, notably slubbing, roving, spinning and twisting frames, for working with any fibrous material.

Spinning machines in general provide the use of driving arrangements for presenting the sliver in form of laps or bobbins to the draft or delivery mechanism, there being accepted single and multiple winding of the fibrous strands or threads.

Owing to the kind of winding, more or less irregularity has been experienced in presenting the fibrous strands or threads to the draft or delivery mechanisms following the driving arrangements, and, therefore, special means for guiding the fibrous strands or threads between the creel and the driving arrangements respectively and the draft or delivery mechanism have been indispensable. Contrary to this, the object of the present invention is to provide a simplification on principle of the construction of the machine and a more favourable effect, from the point of view of textile technology, upon the fibrous material than has been the case hitherto. It chiefly consists of a functional combination of the feeding and unwinding process with the process of drafting and delivery, and is based on the understanding that it might well be possible to take advantage of the weight of the laps and the natural retarding force of the fibres, on the one hand, and of the kind of their arrangement on the driving mechanisms, on the other hand, with a view to eliminating the usual pressure and thread guide elements in the feed and simplifying the construction of the draft and delivery mechanism of spinning machines considerably.

Accordingly, the invention consists in the lap participating in the function of the draft or delivery mechanism as an integral part thereof. Correspondingly, the retarding function in the draft or delivery mechanism is determined by the wedge angle formed between the lap and a carrying element therefor. A special feature of the invention is that said angle can be adjusted. Besides, the retarding function in the draft or delivery mechanism can be rendered additionally variable by varying the arc of contact of the fibrous strand with the feed and delivery roller respectively.

The carrying element for the lap can be designed in various ways. For example, it may consist of a driving roller and a fixed bearing which is preferably adjustable at an angle to the axis of said roller, or of at least two rollers of which at least one is a driving roller. In the latter case, it is advisable for the two rollers to be adjustable relative to each other.

When using two driving rollers, at least one of them may have a formed or covered surface for obtaining the necessary grip. To ensure adaptation to the respective length of fibres, the driving rollers may be interchangeable, so that either a fluted or a plain roller will be nearest to the working assembly following it. When dealing with fibres of a length exceeding the distance limited by the driving roller, then, instead of extending the drafting field, some fibre retarding appliance, for example, a pressure roller, may be fitted to the bobbin at its periphery, according to the length of fibres.

In so far as a sufficient retardation during the draft is not ensured by the fibrous material itself, some additional effect is possible by weighting the bobbin. According to another suggestion of the invention, influence upon the angular contact between the lap and its carrying element is also possible by providing the driving rollers to be encircled by an endless belt by means of which the fibres are guided most carefully. Varying the arc of contact of the sliver or fibrous strand with the driving roller for the purpose of influencing the retarding function is also possible in various ways, one suggesting, for example, that a separate nipping roller should be added to the roller which is nearest to the working assembly, which nipping roller will facilitate the processing of fibres, particularly short-stapled and sensitive ones.

The results obtained by the new function of the lap may be still more favourable if, in accordance with another suggestion, the kind of bobbin winding, that is to say the shape of winding, is adapted to the subsequent operation. This operation determines whether plainly wound laps or laps with crossed strands, or whether narrow or broad-faced laps should be used.

With close spindle centres, for instance, it is an advantage to arrange the laps side by side at such distances from one another as will suit the function of the following working assembly. In this connection, it is advisable for two fibrous strands to be wound, either in the same or in opposite direction, on a common lap or bobbin carrier at a certain distance from each other. In order to avoid faulty drafts due to varying feed lengths when unwinding the fibrous strands from the lap, it is further suggested that said strands should be wound on the bobbins with a pitch decreasing towards the centre of the bobbin.

In twisting frames, the invention can with advantage be employed in such a manner that the lap together with its carrying element at the same time is the driving and delivery element of a delivery mechanism. Preferably in connection with twisting frames, the laps including their carrying and driving elements respectively can be arranged in such a way that the threads, on leaving the lap or bobbin, are presented directly to the spindles to be fed, in accordance with another suggestion of the invention. To this end, the laps or bobbins may be placed vertically or almost vertically above the spindles.

For attaining special results, for instance, simplifying the stocking and ensuring an uninterrupted operation, there can be provided several lines of laps or bobbins which are parallel with each other and are located on corresponding driving rollers, it being understood that the laps or bobbins of one line may be staggered relative to those of the other line. In such cases, the parallel and staggered laps or bobbins of each line may be driven by at least one roller which they have in common with an adjacent line.

In the drawing showing some examples of embodiment of the invention:

Figure 1 is a diagrammatic end view of a drawing frame with a lap feed as is usually employed in spinning machines;

Figure 2 is a diagrammatic end view of a lap feed system in accordance with the present invention;

Figure 3 is a diagrammatic end view showing the conventional arrangement of bobbin feed for twisting frames;

Figure 4 is a similar diagram illustrating the invention as applied to a twisting frame;

Figure 8:
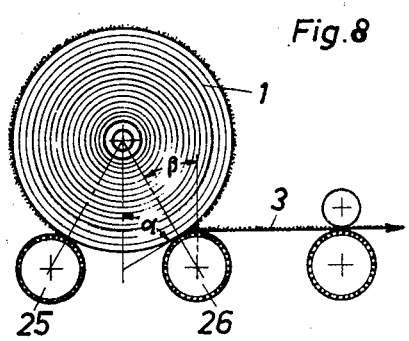
Figures 8 and 8a are diagrammatic end views of a bobbin feed system similar to that of Figs. 5 and 7 particularly illustrating the conditions during the process of unrolling.
Figure 13:
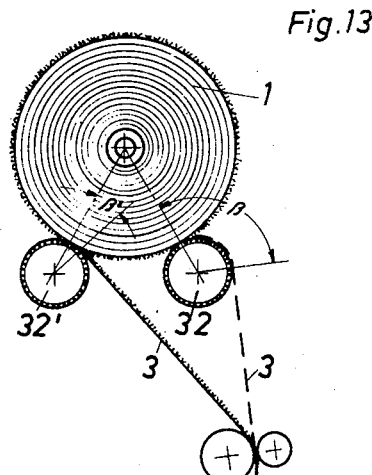
Figure 16:
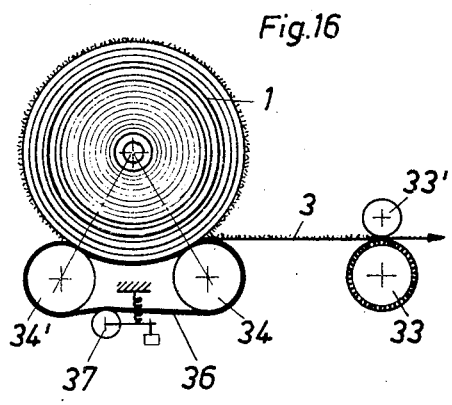
Figure 14:
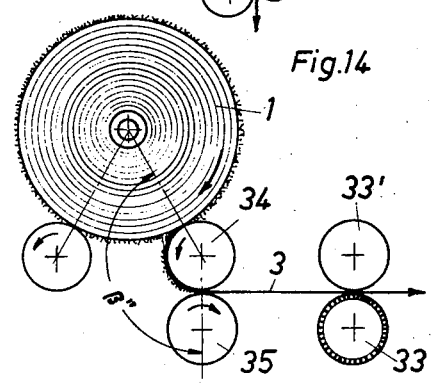
Figure 15:
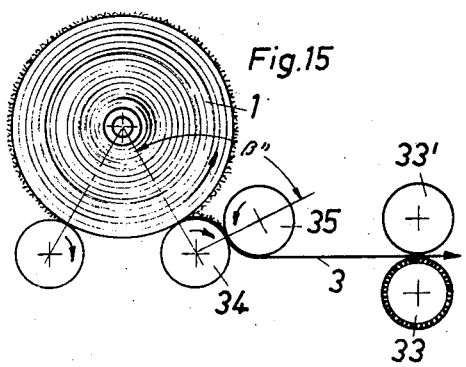
Figure 9:
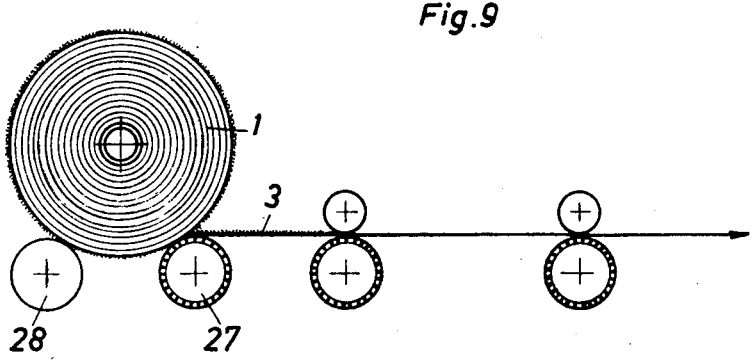
Figure 10:
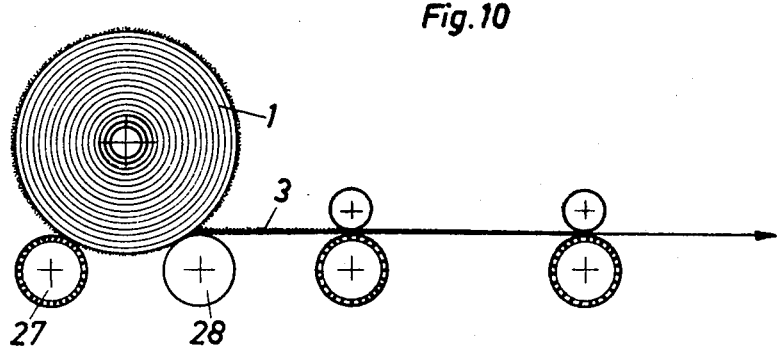
Figure 11:
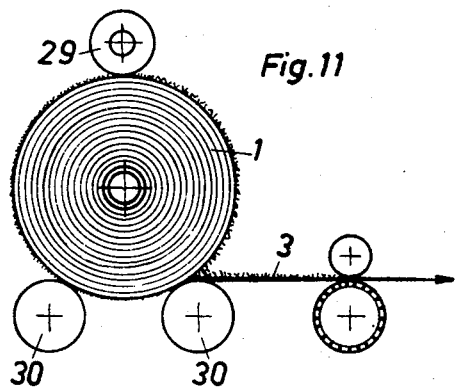
Figure 12:
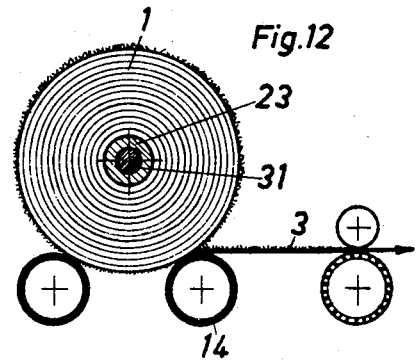
Figure 17:
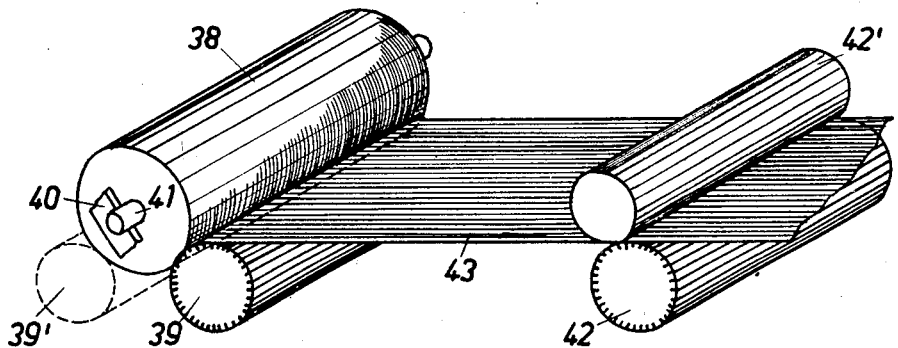
Figure 18:
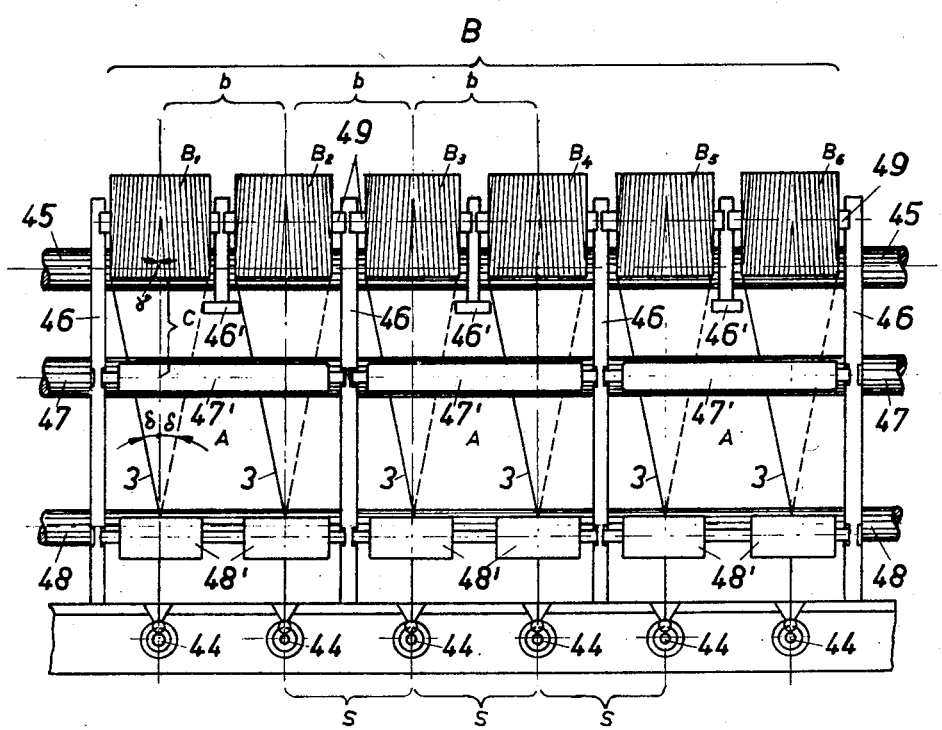

Figs. 9 and 10 respectively show the bobbin feed system of Fig. 8 with one fluted and one plane roller in two different arrangements;

Figures 11 and 12 are similar end views indicating pressure rollers and weighting means respectively;

Figure 13 is a diagrammatic end view showing one feasible form of unrolling with the fibrous strand or thread running off between the driving rollers;

Figures 14 and 15 are diagrammatic end views showing two more forms of embodiment of the invention;

Figure 16 is a diagrammatic end view showing another form of embodiment of the invention;

Figure 17 is a diagrammatic view of a broad-faced lap feed system in accordance with the invention;

Figure 18 is a diagrammatic plan view of a bobbin feed system in accordance with the invention as applied to a spinning frame;

In order to present a general idea of the invention and to demonstrate the advance over previous methods accomplished thereby, a drafting mechanism of the conventional type employed in ring spinning frames is shown in Fig. 1 in comparison with a system embodying the principles of the invention, as shown in Fig. 2.

In the known system shown in Fig. 1, the lap 1 (the roving bobbin) rests on a driving roller 2, and the fibrous strand (the roving) 3 passes at first a thread guide eyelet, funnel, or similar guiding means 4 before entering the drawing frame proper. The feed roller 5 has the usual top roller 6 which serves to retard the fibers during the drawing operation. The fibers in process pass the rollers 7, 8 and the respective top rollers 9, 10, and from the point of delivery which is given by the nip between the delivery roller 11 and the pressure roller 12 the fibrous strand so drawn travels through the eyelet 13 to the spinning spindle (not shown).

It is apparent that this system requires a considerable width of machine and cannot do without special thread guides 4 to ensure a regular feed of the roving, or the retarding pressure roller 6. Owing to the present invention these arrangements can be dispensed with, and the floor space required by the machine is considerably reduced whereby the productive capacity of a given spinning room area is increased by the installation of a greater number of machines.

The invention is based on the idea that the lap itself should be allowed to participate as an integral part in the function of the drafting or delivery mechanism. Hitherto this has not been the case, for the lap has been nothing but a stock from which to draw a continuous supply of spinning material, and the lap as such has not been expected to exercise any technical function in the drafting and delivery process proper. Such functions, as will appear from the example shown in Fig. 1, have been allotted only to such elements as the guiding appliances 4 (being preparatory means for the smooth feed of the thread), and more particularly the feed rollers 5 and 6 which have had to effect the initial retardation in the drafting operation, it being understood that the nipping effect caused by the weight of the top roller 6 is a decisive factor.

As will be seen from Fig. 2, the functional combination of the unrolling operation with the drafting and delivery operation is accomplished by a very specific bearing arrangement for the lap 1 which replaces the nip of the rollers 5, 6 partially by the inherent retarding power of the fibrous material on its carrying roller 5, partially by the wedge effect produced by the angle $\alpha$ between the lap 1 and its carrying element, and partially by the length of the arc of contact $\beta$ with the carrying roller 5. It is obvious that a reciprocal variation of these components affords a variety of possibilities to influence the drafting and delivery process according to the kind and characteristics of the raw material being processed or the quality of the yarn desired.

Specifically referring to the example shown in Fig. 2, the wedge angle $\alpha$ is determined by the amount of inclination of the support 15 which is pivotally mounted on the machine frame as at 16 and the angular position of which can be varied by means of the adjusting screw 17. The arc of contact depends on the amount of inclination of the following working assembly, the drafting and delivery mechanism, from the horizontal. In the event of this assembly being not adjustable at an angle in its entirety, the arc of contact $\beta$ is constant for a given type of machine, and with a given angle $\beta$, the wedge angle $\alpha$ then determines the retarding force in addition to the retarding effect exercised by the fiber as such.

With twisting machines, conditions are similar. Contrary to the known types of machine (Fig. 3) in which the fibrous material to be twisted is drawn from the reserve lap 1, which may be placed on a driving roller 2 and is then required to pass the complicated thread guide and holding elements 18, 19, 20 before it is fed to the spindle through the delivery roller 21 and the eyelet 13, the construction of the machine is considerably simplified by the application of the invention. This is shown in Fig. 4. With this form of embodiment, the lap 1 rests on a carrying element consisting of a delivery roller 21, which rotates at a given speed, and the supports 22 which are adjustable at an angle to the axis of said roller, and during the process the axle 23 of the lap 1 rolls down the legs of said supports running either side of said lap 1. Thus all thread guide and pressure elements are eliminated, also the stopping devices 24 (Fig. 3), for, in case of a yarn break, no stoppage is required owing to the characteristics of the unrolling process providing the thread to be rolled up automatically by the lap when breaking.

Figure 5:
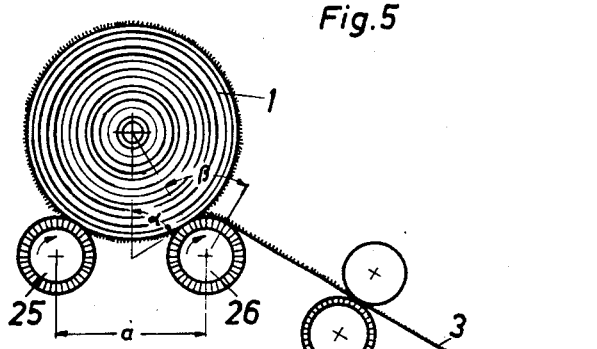
Figure 5 is a diagrammatic end view showing another form of embodiment of the invention.

The underlying idea of the invention, suggesting that the lap should on principle be allowed to participate as an integral part in the drafting and delivery process, reveals a variety of applications in designing the drafting or delivery mechanisms. Fig. 5 shows such an application. Here the lap 1 rests on two fluted rollers 25, 26 which rotate at a predetermined speed. In conformity with the distance "a" between the centers of the rollers 25, 26 and depending on the diameter of lap 1, a wedge angle $\alpha$ results which determines the magnitude of the retarding force in conjunction with the arc of contact $\beta$ and the weight of the lap.

Figure 6:
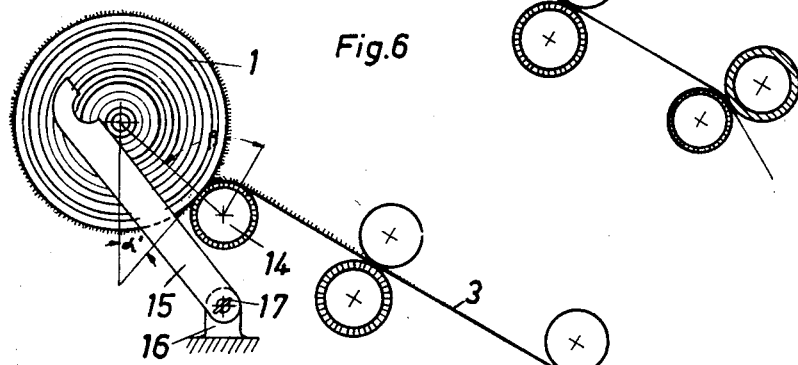
Figure 6 illustrates the possibility of varying the wedge angle between the lap and its carrying element.
Figure 7:
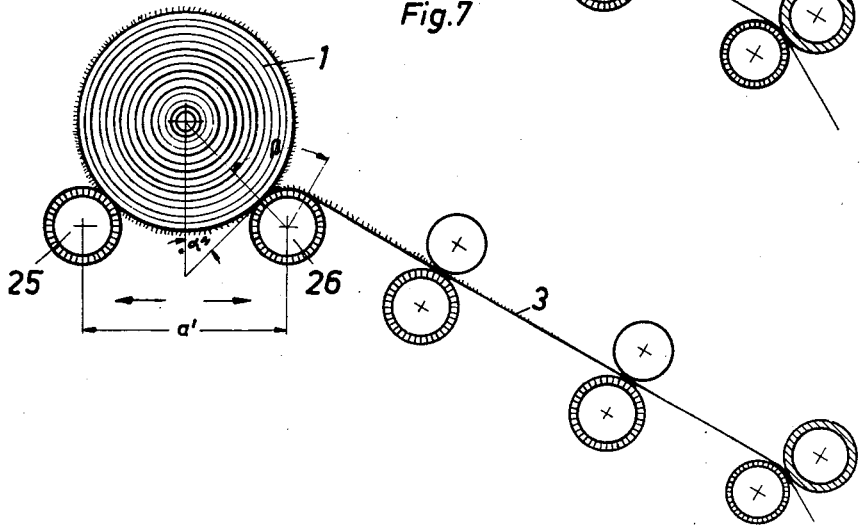
Figure 7 illustrates the same possibility with respect to the arrangement shown in Fig. 5.

Whereas, in the example shown in Fig. 2, said angle $\alpha$ can be varied by moving the support 15 by means of the adjusting screw 17 to form angle $\alpha'$, as indicated in Fig. 6, it can be increased or decreased, in the example shown in Fig. 5, by varying the distance "a" from center to center of the fluted rollers 25, 26. This is accomplished by increasing or decreasing the distance between the rollers 25, 26 as shown in Fig. 7 indicating the rollers as set at a distance "a'" which results in the wedge angle $\alpha''$.

Figure 8A:
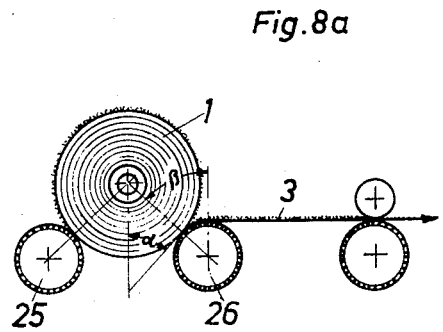

The fact that the retarding force will not change in a system as shown in Fig. 5 where the wedge angle automatically declines as the diameter of the lap decreases during the process, is evident from Figs. 8 and 8a: with the diameter of lap decreasing and the wedge angle declining, the lap 1 also loses in weight, and the greater wedge effect is at the same ratio balanced by the reduced weight of the lap. Therefore, the retarding force of the lap remains constant.

But there is another way of varying the retarding force, for example, by designing the lap driving element more specifically with a view to ensuring different staples to be treated properly. Here the invention reveals adaptations as have not been made possible by any previous means.

The Figures 9 and 10 illustrate these possibilities. For example, if it is a question of processing fibrous strands which are almost equal in staple, the driving roller nearest to the following drafting elements will be a fluted roller 27, whereas the back roller 28 may be plain (Fig. 9); if longer staples dominate or if the staples are more different, exchanging the rollers 27 and 28 (Fig. 10) is all that is required.

With long or widely differing staples dominating, it is possible to allow some additional element, for instance, one in form of a pressure roller 29 (Fig. 11) to have effect upon the circumference of the lap 1, said element then serving as a nipping and retarding element for fibrous material of that kind. In this case, two plain rollers 30, 30' may be used as driving rollers. Generally, the frictional contact between the laps 1 and the driving element can, if required, be further improved upon by additional weighting, which, for example, can be accomplished by placing a metal pin 31 into the roller type lap carrier 23 (Fig. 12). The lap carrying body as a whole can also be made particularly heavy in weight. Again, it is possible to render the frictional contact particularly effective by fitting the driving elements with suitable covers 14 ensuring a safe grip. For this purpose, rubber, cork or similar covering materials may be used.

Further influence on the retarding force, in addition to that ensured by varying the driving arrangement and variable weighting of the lap, is feasible by a variation of the arc contact $\beta$ which in its simplest form is shown in Fig. 13. As will be evident from this figure, the arc of contact $\beta$ of the moving thread 3 with the driving roller 32 is of different value according as the thread 3 is passed over the front driving roller 32 or the back driving roller 32'. In the latter case, a reduction of the arc of contact down to the value $\beta'$ can be obtained and thereby the retarding force be lessened, it being understood that the possibilities already mentioned of altering the wedge angle $\alpha$ or the weighting may, of course, also be applied additionally.

The arc of contact can be varied again by locating special nipping rollers as are shown in the Figures 14 and 15. Such appliances are of importance particularly to short-stapled fibrous material as is being dealt with in carded yarn spinning, for example. When adding a special nipping roller 35 to the driving roller 34 which is nearest to the working rollers 33, 33' and which may be either plain or fluted, an arc of contact $\beta''$ is obtained which, in conjunction with the other components determining the retarding force, ensures a careful treatment of the short-stapled fibrous material.

The combination providing a simultaneous variation of the wedge angle and of the arc of contact $\beta$ is obtained by fitting a driving arrangement comprising an endless belt 36 which passes around the driving rollers 34, 34' (Fig. 16) at a peripheral speed which is selected to correspond to that of the following working assembly 33, 33', it being understood that the surface of the belt may be roughened, fluted or grooved to improve the grip. A tightening device, as indicated by the spring loaded pulley 37, provides a safe contact of the belt with the driving rollers even if it is not loaded with lap 1. Of course, pressure rollers 29 or weighting means 31 for the laps 1 or a nipping roller 35 for the driving roller may be employed in this case, too. Such appurtenances are suitable for fibrous materials which require to be treated most carefully.

In accordance with another idea of the invention, the kind of bobbin winding is adapted to the subsequent working assembly, which means that the invention is applicable to any type of spinning machine irrespective of the different working widths thereof. For instance, it is immaterial whether broad-faced laps (sliver, web, fleece and other types of broad-faced laps) or laps of fibrous strands in the form of bobbins are used. Fig. 17, for example, shows a broad-faced lap 38 which, resting on a driving roller 39, is backed by the support 40 which is indicated schematically and is completed by another support at the opposite end of the lap axle 41, or by a second driving roller 39' (indicated by broken lines). The driving elements rotate at a speed to suit the height of draft desired. In this case, too it is essential that the unit 38, 39, 40 and 39' respectively forms an active part of the following working unit (drafting or delivery mechanism 42, 42'). Instead of rollers functioning as working units, other types of draft or delivery mechanisms known in spinning practice may be considered, such as systems using gill boxes, needle rollers, also single or multiple apron systems. The sliver is, therefore, under tension for the length 43, and special guiding means are no longer required.

In Fig. 18 the invention is shown as embodied in ring spinning frame.

Rather closely spaced at equal distances "s" from centre to centre, the spindles 44 are fed by the drawing frames A (shown diagrammatically) with the fibrous strands 3 to be spun which run off the roving bobbins B.

The roving bobbins $B_1$ to $B_6$, together with their carrying elements, the driving roller 45 and the supports 46, 46', form one functional unit with the rollers 47, 47' and 48, 48' of the individual drawing frames A, participating as they do in the drawing operation.

In this it is an advantage if the lap carriers 49 are wound in such a manner that the distances "b" of the individual laps $B_1$, $B_2$, $B_3$ and so forth are adapted to the function of the following working assemblies—which, in this case, are the drawing frame rollers 47, 47' and 48, 48' respectively—and the spindle gauge "s" respectively. Since each of the draft rollers incorporated in the drawing frames A has to deal with two fibrous strands 3, the distance "b" of the lap bobbins should accordingly be made to suit the available width of the drawing frames and consequently the spindle centers "s," so that the flow of fibers from the laps B to the spindles 44 is controlled in such a way that the deflection imparted to the strands 3 on leaving the laps is always the same for all the laps B. Naturally, these deflections become more and more negligible the smaller the face width of the various laps. In order to ensure a still greater adaptation to the function of the drawing frames A, to make up for any differences in the lap diameters, and to facilitate a quicker change of the bobbins, the arrangement of each two laps $B_1$, $B_2$; $B_3$, $B_4$; $B_5$, $B_6$; and so forth on a common bobbin carrier is of advantage. The fibrous strands placed on a common lap carrier may be wound in such a way that they run off, as shown, in the same or in opposite directions. If it is desired to avoid any differences in the draft as might result from the length of feed C varying constantly during the unrolling movement from the laps B, it is advisable for said strands to be wound-on in such a manner that the angle of twist in the yarn will steadily decrease towards the vertical center line of the laps B. This can be easily achieved by regulating the winding speed accordingly. Thus the transverse motion elements (roving guide etc.) previously required, affecting the fibrous strands transversely to the direction of draft, are eliminated, since natural unrolling presents the fibrous strands 3 to the nip of the draft elements 47, 47'; 48, 48' at an angle 2 $\delta$ whereby a to-and-fro movement and consequently some gentle rubbing of the fibrous material is effected without damaging the latter, this rubbing being initiated already on the roller 45 with the material leaving the laps B.

What I claim and wish to secure by Letters Patent is:

1. In a system for changing the condition of fibrous material for use in connection with textile machines, which includes a plurality of relatively closely spaced lower roller means supporting correspondingly arranged upper roller means, one of said lower roller means being arranged to be motor driven, shaft means, fibrous material wound upon said shaft means and resting on said one roller means so that the vertical plane through said shaft means is located outside the vertical plane through said one roller means, said fibrous material while in wound condition on said shaft means representing one of said upper roller means cooperating with said relatively closely spaced lower roller means and being arranged for passing fibrous material over an arched portion of said one lower roller means, said arched portion automatically increasing with the unwinding of fibrous material from said shaft means.

2. In combination in a draft or delivery mechanism for textile machines, a power driven roller forming a lower draft roller of the draft mechanism proper, rotatable means carrying fibrous material to be unwound therefrom, said fibrous material resting on said roller and together with said rotatable fibrous material carrying means forming an active fiber treating element of the drafting mechanism proper for drafting said fibrous material, the axis of rotation of said rotatable means being located outside the vertical plane passing through the axis of rotation of said roller to thereby in cooperation with said roller allow downward movement of said fibrous material carrying means at a rate proportional to the rate at which said fibrous material is being unwound.

3. In combination in a draft or delivery mechanism for textile machines, a power driven roller forming a lower draft roller of the draft mechanism proper, shaft means carrying fibrous material to be unwound therefrom and laterally protruding from said fibrous material, said fibrous material resting on said roller and together with said shaft means forming an active fiber treating element of the draft mechanism proper for drafting said fibrous material, and supporting means supporting said shaft means so that throughout the entire unwinding operation the vertical plane passing through said shaft means is located outside the vertical plane passing through said power driven roller to thereby allow downward movement of said shaft means on said supporting means while said fibrous material is being unwound from said shaft means.

4. In combination in a drafting or delivery mechanism for textile machines, a power operable roller forming a lower drafting roller of the drafting mechanism proper, a bobbin having fibrous material wound thereon and resting on said lower drafting roller so that the axis of rotation of said bobbin throughout the drafting operation is located outside the vertical plane passing through said lower drafting roller to thereby allow the fibrous material being unwound from said bobbin to pass around an arched section of said lower drafting roller, said bobbin with the fibrous material thereon forming an upper drafting roller, and means arranged for cooperation with said bobbin and said lower roller to vary the arched section passed over by the fibrous material of said lower roller independently of the unwinding of said fibrous material and independently of said lower roller.

5. In combination in a draft or delivery mechanism for textile machines, a power driven roller, means carrying fibrous material to be unwound, said material resting on said roller and together with said fibrous material carrying means forming an active fiber treating element of the actual mechanism for treating said fibrous material, and supporting means having an inclined supporting surface slidably supporting said fibrous material carrying means so as to allow downward movement of said last-mentioned means on said surface during the unwinding of said fibrous material.

6. In combination in a draft or delivery mechanism for textile machines, a power driven roller, bobbin means carrying fibrous material to be unwound, said material resting on said roller, said bobbin means laterally protruding from said fibrous material and forming together therewith an active part of the actual mechanism for treating said fibrous material, supporting means having an inclined supporting surface slidably supporting said bobbin means, and means operatively connected with said supporting means and adapted to vary the angle of inclination of said supporting surface with regard to a horizontal plane.

7. In combination in an arrangment for use in connection with textile machines to treat fibrous material being unwound from carrying means carrying the fibrous material, a power driven roller supporting said fibrous material, supporting means independent of said power driven roller for supporting said carrying means, said carrying means together with the fibrous material carried thereby forming an active fiber treating element of the actual fiber treating mechanism, and means operatively connected to said supporting means for varying the relative position of the axis of rotation of said power driven roller with regard to said carrying means.

8. An arrangement according to claim 1, in which the fibrous material wound upon said shaft means and resting on said one roller means additionally rests on a second roller means, the vertical plane through said shaft means being located outside the vertical plane through said second roller means.

9. An arrangement according to claim 8, in which the two roller means on which the fibrous material on said shaft means rests are designed as fluted rollers.

10. An arrangement according to claim 8, in which the two rollers on which the fibrous material on said shaft means rests are adjustable relative to each other for varying the distance therebetween.

11. An arrangement according to claim 1, in which the fibrous material wound upon said shaft means and resting on said one roller means additionally rests on a second roller means, the vertical plane through said shaft means being located outside the vertical plane through said second roller means, either one of said one roller means and said second roller means being arranged for selectively receiving the fibrous material being unwound from said shaft means for delivering the unwound fibrous material to and between an adjacent pair of cooperating roller means located at a level lower than the level of said two roller means upon which rests the fibrous material on said shaft means.

12. An arrangement according to claim 1, in which the fibrous material wound upon said shaft means is a broad-faced lap, and in which supporting members with inclined surfaces support each end of said shaft means.

13. In combination in a fiber treating mechanism for textile machines, a power operable roller forming a delivery roller of the fiber treating mechanism proper, a bobbin having fibrous material to be twisted wound thereon and resting on said delivery roller so that the axis of rotation of said bobbin throughout the twisting operation is located outside the vertical plane passing through said delivery roller to thereby allow the fibrous material being unwound from said bobbin to pass around an arched section of said delivery roller, said bobbin with the fibrous material thereon forming a lap, and means arranged for cooperation with said bobbin and said delivery roller to vary the arched section passed over by the fibrous material of said delivery roller independently of the unwinding of said fibrous material and independently of said delivery roller.

References Cited in the file of this patent

UNITED STATES PATENTS 1,351,678     Nuckols                Aug. 31, 1920

(Other references on following page)

UNITED STATES PATENTS

| | | |
|---|---|---|
| 1,674,702 | Roth | June 26, 1928 |
| 2,067,250 | Taylor | Jan. 12, 1937 |
| 2,143,876 | Harris | Jan. 17, 1939 |
| 2,566,922 | Brown et al. | Sept. 4, 1951 |

FOREIGN PATENTS

| | | |
|---|---|---|
| 298,513 | Italy | July 8, 1932 |
| 474,612 | Great Britain | Nov. 2, 1937 |
| 870,581 | France | Mar. 16, 1942 |